United States Patent
Kawagoe et al.

(10) Patent No.: US 10,961,379 B2
(45) Date of Patent: Mar. 30, 2021

(54) ULTRAVIOLET CROSSLINKABLE COMPOSITION COMPRISING AN ACRYLIC POLYMER HAVING AN ULTRAVIOLET CROSSLINKABLE SITE

(71) Applicant: 3M INNOVATIVE PROPERTIES COMPANY, St. Paul, MN (US)

(72) Inventors: Minori Kawagoe, Kanagawa Pref. (JP); Yorinobu Takamatsu, Kanagawa Pref. (JP); Kyoko Yumiza, Tokyo (JP); Akihiko Nakayama, Shizuoka (JP)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 15/550,881

(22) PCT Filed: Mar. 4, 2016

(86) PCT No.: PCT/US2016/020863
§ 371 (c)(1),
(2) Date: Aug. 14, 2017

(87) PCT Pub. No.: WO2016/144742
PCT Pub. Date: Sep. 15, 2016

(65) Prior Publication Data
US 2018/0022910 A1 Jan. 25, 2018

(30) Foreign Application Priority Data

Mar. 6, 2015 (JP) .............................. JP2015-044779

(51) Int. Cl.
| | | |
|---|---|---|
| *B32B 7/12* | (2006.01) | |
| *B32B 27/08* | (2006.01) | |
| *B32B 27/36* | (2006.01) | |
| *B32B 27/40* | (2006.01) | |
| *B29C 59/02* | (2006.01) | |
| *C08L 33/12* | (2006.01) | |
| *B32B 27/30* | (2006.01) | |
| *C08F 220/14* | (2006.01) | |
| *C08F 265/06* | (2006.01) | |
| *B29C 35/08* | (2006.01) | |
| *B29K 33/00* | (2006.01) | |

(52) U.S. Cl.
CPC .......... *C08L 33/12* (2013.01); *B29C 35/0805* (2013.01); *B32B 7/12* (2013.01); *B32B 27/08* (2013.01); *B32B 27/308* (2013.01); *B32B 27/36* (2013.01); *B32B 27/40* (2013.01); *C08F 220/14* (2013.01); *C08F 265/06* (2013.01); *B29C 59/02* (2013.01); *B29C 2035/0827* (2013.01); *B29K 2033/12* (2013.01); *B32B 2250/24* (2013.01); *B32B 2255/10* (2013.01); *B32B 2255/26* (2013.01); *B32B 2307/536* (2013.01); *B32B 2307/584* (2013.01); *B32B 2307/748* (2013.01); *B32B 2405/00* (2013.01); *B32B 2451/00* (2013.01); *C08L 2205/025* (2013.01); *C08L 2312/06* (2013.01)

(58) Field of Classification Search
None
See application file for complete search history.

(56) References Cited

U.S. PATENT DOCUMENTS

| | | | |
|---|---|---|---|
| 5,558,911 A | 9/1996 | Blum | |
| 2012/0010317 A1* | 1/2012 | Schmitt | ..................... C08F 2/50 522/35 |
| 2014/0073717 A1 | 3/2014 | Urban | |
| 2014/0302313 A1* | 10/2014 | Suwa | ....................... C09J 7/385 428/355 AC |
| 2015/0299451 A1 | 10/2015 | Satou | |

FOREIGN PATENT DOCUMENTS

| | | |
|---|---|---|
| EP | 1170109 | 1/2002 |
| JP | 1986-081461 | 4/1986 |
| JP | 1986-266345 | 11/1986 |
| JP | 1995-504926 | 6/1995 |
| JP | 8-252985 | 10/1996 |
| JP | 1997-131846 | 5/1997 |
| JP | 11-48626 | 2/1999 |
| JP | 2001-49072 | 2/2001 |
| JP | 2001-509089 | 7/2001 |
| JP | 2001-240717 | 9/2001 |
| JP | 2003-277521 | 10/2003 |
| JP | 2004-004515 | 1/2004 |
| JP | 2004-508435 | 3/2004 |
| JP | 2008-231355 | 10/2008 |
| JP | 2009-035588 | 2/2009 |
| JP | 2013-040256 | 2/2013 |
| WO | WO 1997-40090 | 10/1997 |
| WO | WO 2009-018253 | 2/2009 |

OTHER PUBLICATIONS

International Search Report for PCT International Application No. PCT/US2016/020863, dated May 2, 2016, 4 pages.

* cited by examiner

*Primary Examiner* — Sheeba Ahmed
(74) *Attorney, Agent, or Firm* — Philip P. Soo

(57) ABSTRACT

An ultraviolet crosslinkable composition that can provide a cured product that is easy to mold, can maintain a molded shape even under a high temperature environment, and has excellent physical properties, for example, chemical resistance, scratch resistance and the like. The ultraviolet crosslinkable composition can contain a thermoplastic acrylic resin in which a glass transition temperature is 25° C. or higher and a (meth) acrylic copolymer having an ultraviolet crosslinkable site in which a glass transition temperature is 25° C. or higher.

12 Claims, No Drawings

ULTRAVIOLET CROSSLINKABLE COMPOSITION COMPRISING AN ACRYLIC POLYMER HAVING AN ULTRAVIOLET CROSSLINKABLE SITE

CROSS REFERENCE TO RELATED APPLICATIONS

This application is a national stage filing under 35 U.S.C. 371 of PCT/US2016/020863, filed Mar. 4, 2016 which claims the benefit of Japan Application No. 2015-044779, filed Mar. 6, 2015, the disclosures of which are incorporated by reference in their entireties herein.

TECHNICAL FIELD

The present disclosure relates to an acrylic ultraviolet crosslinkable composition, and more specifically relates to an ultraviolet crosslinkable composition having moldability.

BACKGROUND ART

Ultraviolet crosslinkable compositions are used in various applications such as coating materials, film molding materials, adhesives, pressure sensitive adhesives, sealants, and potting materials. An ultraviolet crosslinkable composition typically contains a polymer having a reactive functional group on a side chain, and a crosslinking structure is formed by a reaction between reactive functional groups or the reactive functional group and a crosslinking agent. The reaction is initiated by a photo radical initiator or photo cationic initiator generating an active variety by ultraviolet irradiation.

Japanese Unexamined Patent Application Publication No. 2013-040256 describes "a radiation curable adhesive sheet composed of a (meth) acrylic copolymer having a radiation reactive site and a plasticizer capable of forming a bond with the (meth) acrylic copolymer by radiation exposure."

SUMMARY OF THE INVENTION

An ultraviolet crosslinkable composition having an adaptable characteristic for thermoforming such as melt extrusion and heat embossing is desired.

The present disclosure provides an ultraviolet crosslinkable composition that can provide a cured product that is easy to mold, can retain a molded shape even under a high temperature environment, and has excellent physical properties, for example, chemical resistance, scratch resistance, and the like.

One embodiment of the present disclosure provides an ultraviolet crosslinkable composition containing a thermoplastic acrylic resin in which a glass transition temperature is 25° C. or higher and a (meth) acrylic copolymer having an ultraviolet crosslinkable site in which a glass transition temperature is 25° C. or higher.

Effects of the Invention

The ultraviolet crosslinkable composition of the present disclosure has excellent moldability due at least in part, or mainly, to containing a thermoplastic acrylic resin in which a glass transition temperature is 25° C. or higher and a (meth) acrylic copolymer having an ultraviolet crosslinkable site in which a glass transition temperature is 25° C. or higher, and can retain a shape formed by ultraviolet crosslinking even under a high temperature environment. Furthermore, because the glass transition temperatures of the thermoplastic acrylic resin and the (meth) acrylic copolymer having an ultraviolet crosslinkable site are both relatively high at 25° C. or higher, a cured product can be obtained that has excellent chemical resistance, scratch resistance and the like, in which bleed out, migration to another article, elution and the like are minimal for a component that can remain in an uncrosslinked state after ultraviolet irradiation.

Note that, the description given above shall not be regarded as disclosing all embodiments of the present invention and all advantages relating to the present invention.

EMBODIMENTS OF THE INVENTION

Descriptions for the purpose of exemplifying representative embodiments of the present invention will be given in further detail below, but the present invention is not limited to these embodiments.

In the present disclosure "(meth) acrylic" refers to "acrylic" or "methacrylic"; "(meth) acrylate" refers to "acrylate" or "methacrylate"; and "(meth) acryloyl" refers to "acryloyl" or "methacryloyl".

In the present disclosure, "an ultraviolet crosslinkable site" refers to a site activated by ultraviolet irradiation and can form crosslinks between other portions inside the molecules of a (meth) acrylic copolymer having thermoplastic acrylic resin and an ultraviolet crosslinkable site or other molecules of a (meth) acrylic copolymer having thermoplastic acrylic resin and an ultraviolet crosslinkable site.

In the present disclosure, "a glass transition temperature (Tg)" is defined as a peak temperature using a dynamic viscoelasticity measuring device, raising at a temperature elevation rate of 5° C./minute from −60° C. to 250° C., and is a loss factor tan δ obtained by measuring the shear storage modulus G' and the shear loss modulus G" every 12 seconds at a shear mode frequency of 1.0 Hz (=shear loss modulus G"/shear loss modulus G').

The ultraviolet crosslinkable composition of the example of the present disclosure contains a thermoplastic acrylic resin in which a glass transition temperature is 25° C. or higher and a (meth) acrylic copolymer having an ultraviolet crosslinkable site in which a glass transition temperature is 25° C. or higher.

The thermoplastic acrylic resin can contain a methyl methacrylate homopolymer, in other words, a polymethyl methacrylate; or methyl methacrylate and methyl acrylate as well as a straight chain of 2 to 22 C; and a thermoplastic (meth) acrylic copolymer of at least one acrylate monomer selected from an alkyl (meth) acrylate having a branched or a cyclic alkyl group.

Examples of the alkyl (meth) acrylate having a straight chain of 2 to 22 C composing the thermoplastic (meth) acrylic copolymer and having a branched or a cyclic alkyl group include ethyl (meth) acrylate, n-butyl (meth) acrylate, hexyl (meth) acrylate, n-octyl (meth) acrylate, 2-ethylhexyl (meth) acrylate, Isobutyl (meth) acrylate, tert-butyl (meth) acrylate, cyclohexyl (meth) acrylate, isobornyl (meth) acrylate, dicyclopentanyl (meth) acrylate and the like.

The thermoplastic acrylic resin of several examples includes approximately 20 mass % or above, approximately 35 mass % or above, or approximately 50 mass % or above and 100 mass % or below of a methyl methacrylate unit.

The thermoplastic (meth) acrylic copolymer may have a polymerization unit derived from another monomer other than the monomer described above. Examples of such monomer include olefins such as ethylene, butadiene, isoprene, and isobutylene; vinyl monomers such as vinyl acetate, vinyl propionate, and styrene; carboxyl group-containing monomers such as hydroxyethyl (meth) acrylate, 2-hydroxypropyl (meth) acrylate, 3-hydroxypropyl (meth) acrylate, 2-hydroxybutyl (meth) acrylate, 4-hydroxybutyl (meth) acrylate, 1,4 cyclohexane dimethanol mono (meth) acrylate, 1-glycerol (meth) acrylate, 2-hydroxyethyl (meth) acrylamide, N-hydroxypropyl (meth) acrylamide, vinyl alcohol, and allyl alcohol; carboxyl group-containing monomers or anhydride thereof (maleic anhydride and the like) such as (meth) acrylic acid, itaconic acid, maleic acid, fumaric acid, crotonic acid, and isocrotonic acid; amide group-containing monomers such as N-vinylcaprolactam, N-vinylpyrrolidone, (meth) acrylamide, N-methyl (meth) acrylamide, N,N-dimethyl (meth) acrylamide, and N-octyl (meth) acrylamide; and amino group-containing monomers such as N,N-dimethylaminoethyl (meth) acrylate, N,N-diethylaminoethyl (meth) acrylate, and N,N-diethylaminoethyl (meth) acrylamide.

The glass transition temperature (Tg) of the thermoplastic acrylic resin is approximately 25° C. or higher. In several of the examples, the glass transition temperature of the thermoplastic acrylic resin is approximately 40° C. or higher, approximately 60° C. or higher, or approximately 80° C. or higher, approximately 170° C. or lower, approximately 160° C. or lower, or approximately 150° C. or lower.

The weight-average molecular weight of the thermoplastic acrylic resin can be approximately $3.0 \times 10^4$ or more, approximately $4.0 \times 10^4$ or more, or approximately $5.0 \times 10^4$ or more, approximately $1.0 \times 10^6$ or less, approximately $8.0 \times 10^5$ or less, or approximately $6.0 \times 10^6$ or less.

The viscosity of the thermoplastic acrylic resin can be approximately 100 Pa·s or more, 300 Pa·s or more or approximately 500 Pa·s or more, $1.0 \times 10^5$ Pa·s or less, $5.0 \times 10^4$ Pa·s or less, or $1.0 \times 10^4$ Pa·s or less. By making viscosity of the thermoplastic acrylic resin in the range described above, the ultraviolet crosslinkable composition can be suitably used for molding the film by heat and extrusion. Viscosity is value measured by using a dynamic viscoelasticity measuring device to measure the shear loss modulus G" at 230° C. at a shear mode frequency of 1.0 Hz (measuring frequency) and then dividing that value by the measuring frequency.

The (meth) acrylic copolymer having an ultraviolet crosslinkable site in which a glass transition temperature is 25° C. or higher (below, simply referred to as "the (meth) acrylic copolymer having an ultraviolet crosslinkable site") is used as an additive for making the composition containing thermoplastic acrylic resin ultraviolet crosslinkable. Due to the glass transition temperature of the (meth) acrylic copolymer having an ultraviolet crosslinkable site being 25° C. or higher and due to thermoplastic acrylic resin being more compatible compared to a low molecular weight additive, a cured product can be obtained in which there is not a lot of bleed out, migration to another article, elution and the like for a component that can remain in an uncrosslinked state after ultraviolet irradiation; and the cured product has excellent chemical resistance, scratch resistance and the like. Furthermore, due to the ultraviolet crosslinkable composition of the present disclosure having good compatibility among components, micro or macro phase separation and the like tends not to occur, and it is possible to be used advantageously for example, in usages that require high transparency. The ultraviolet crosslinkable site may be a polymerizable functional group such as a (meth) acrylic group and an epoxy group, and may have a structure in which a hydrogen radical can be removed by ultraviolet irradiation.

The (meth) acrylic copolymer having the ultraviolet crosslinkable site of the representative example has a structure in which a hydrogen radical can be removed by ultraviolet irradiation. The structure is excited by ultraviolet irradiation and a hydrogen radical is removed from other portions inside the molecules of a (meth) acrylic copolymer having thermoplastic acrylic resin and an ultraviolet crosslinkable site or other molecules of a (meth) acrylic copolymer having thermoplastic acrylic resin and an ultraviolet crosslinkable site. As a result, various reactions occur within the system such as the generation of radicals on the molecules of the (meth) acrylic copolymer having thermoplastic acrylic resin and an ultraviolet crosslinkable site; the forming of a crosslinked structure by the bond between the generated radicals; the generation of a peroxide radical by a reaction with oxygen molecules and the forming of a crosslinked structure through the generated peroxide radical; and the removal of a different hydrogen radical by the generated radicals; and in the end, the ultraviolet crosslinkable composition is crosslinked. Due to the addition of a photoinitiator not being necessary the ultraviolet crosslinkable site is advantageous in having a structure in which a hydrogen radical can be removed by ultraviolet irradiation.

The structures in which a hydrogen radical can be removed by ultraviolet irradiation include, for example, a benzophenone group, a benzyl group, an o-benzoyl benzoic acid ester group, a thioxanthone group, a 3-ketocoumarin group, a 2-ethylanthraquinone group, and a camphorquinone group and the like. Even among the groups described above, it is advantageous to use a benzophenone group as the ultraviolet crosslinkable site due to points such as transparency, reactivity and the like.

The (meth) acrylic copolymer having a structure in which a hydrogen radical can be removed by ultraviolet irradiation may be a copolymer of (meth) acrylate having a straight chain of 1 to 22 C, at least one alkyl (meth) acrylate selected from an alkyl (meth) acrylate having a branched alkyl group or a cyclic alkyl group, a benzophenone group, a benzyl group, an o-benzoyl benzoic acid ester group, a 3-ketocoumarin group, a 2-ethylanthraquinone group, and a camphorquinone group and the like.

For example, a (meth) acrylate having a benzophenone group, 4-acryloyloxybenzophenone, 4-acryloyloxyethoxybenzophenone, 4-acryloyloxy-4'-methoxybenzophenone, 4-acryloyloxyethoxy-4'-methoxybenzophenzone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and a mixture of these and the like may be used. Even among these, due to having an excellent balance of stability and reactivity, an alkylene group of, for example, 1 to 6 carbons interposed between the (meth) acryloyl group and the benzophenone group is advantageous; and examples of such (meth) acrylate are 4-acryloyloxyethoxybenzophenone, 4-acryloyloxyethoxy-4'-methoxybenzophenone, 4-acryloyloxyethoxy-4'-bromobenzophenone, 4-methacryloyloxyethoxybenzophenone, 4-methacryloyloxyethoxy-4'-methoxybenzophenone, 4-methacryloyloxyethoxy-4'-bromobenzophenone and the like.

Examples of the alkyl (meth) acrylate having a straight chain of 2 to 22 carbons and a branched or a cyclic alkyl group are methyl (meth) acrylate, ethyl (meth) acrylate, n-butyl (meth) acrylate, hexyl (meth) acrylate, n-octyl (meth) acrylate, 2-ethylhexyl (meth) acrylate, Isobutyl (meth) acrylate, tert-butyl (meth) acrylate, cyclohexyl (meth) acrylate, isobornyl (meth) acrylate, and dicyclopentanyl (meth) acrylate and the like.

In several examples, the number of moles for a structure in which a hydrogen radical can be removed by ultraviolet irradiation, for example, a benzophenone group, is approximately 0.3 μmol/g or more and approximately 320 μmol/g or less based on the total mass of the thermoplastic acrylic resin and the (meth) acrylic copolymer having the ultraviolet crosslinkable site in which a glass transition temperature is 25° C. or higher. By making the amount of the structure in which a hydrogen radical can be removed by ultraviolet irradiation in the range described above, the density of the crosslinked structure formed by ultraviolet irradiation can be controlled and the shape retainability of the cured product can be further increased. In a different example, by making the number of moles for the benzophenone group in a range of approximately 10 μmol/g to approximately 150 μmol/g, the composition crosslinked by ultraviolet irradiation can be heated and drawn (for example, in the three-dimensional overlay method, TOM can be approximately 120° C. to 160° C. and can be drawn to approximately 100% or more, or 200% or more). The ultraviolet crosslinkable composition of these examples can be suitably used as a surface layer used in decorative film.

In several examples, the thermoplastic acrylic resin includes approximately 20 mass % or above, approximately 35 mass % or above, or approximately 50 mass % or above and 100 mass % or below of methyl methacrylate; and the (meth) acrylic copolymer having an ultraviolet crosslinkable site is a copolymer of a monomer mixture containing (meth) acrylate having a methyl methacrylate and a benzophenone group. The ultraviolet crosslinkable composition of these examples has particularly excellent compatibility between components.

The (meth) acrylic copolymer having an ultraviolet crosslinkable site in several examples includes approximately 20 mass % or above, approximately 35 mass % or above, or approximately 50 mass % or above, approximately 99.5 mass % or below, approximately 99 mass % or below, or approximately 97 mass % or below of a methyl methacrylate unit.

The (meth) acrylic copolymer having an ultraviolet crosslinkable site may have a polymerization unit derived from another monomer other than the monomer described above. Examples of such monomer are olefins such as ethylene, butadiene, isoprene, and isobutylene; vinyl monomers such as vinyl acetate, vinyl propionate, and styrene; a hydroxyl group-containing monomers such as 2-hydroxypropyl (meth) acrylate, 3-hydroxypropyl (meth) acrylate, 2-hydroxybutyl (meth) acrylate, 4-hydroxybutyl (meth) acrylate, 1,4 cyclohexane dimethanol mono (meth) acrylate, 1-glycerol (meth) acrylate, 2-hydroxyethyl (meth) acrylamide, N-hydroxypropyl (meth) acrylamide, vinyl alcohol, and allyl alcohol; a carboxyl group-containing monomers or anhydride thereof (maleic anhydride and the like) such as (meth) acrylic acid, itaconic acid, maleic acid, fumaric acid, crotonic acid, and isocrotonic acid; amide group-containing monomers such as N-vinylcaprolactam, N-vinylpyrrolidone, (meth) acrylamide, N-methyl (meth) acrylamide, N,N-dimethyl (meth) acrylamide, and N-octyl (meth) acrylamide; and amino group-containing monomers such as N,N-dimethylaminoethyl (meth) acrylate, N,N-diethylaminoethyl (meth) acrylate, and N,N-diethylaminoethyl (meth) acrylamide.

The glass transition temperature (Tg) of the (meth) acrylic copolymer having an ultraviolet crosslinkable site is 25° C. or higher. In several of the examples, the glass transition temperature of the (meth) acrylic copolymer having an ultraviolet crosslinkable site is approximately 40° C. or higher, approximately 60° C. or higher, or approximately 80° C. or higher, approximately 170° C. or lower, approximately 160° C. or lower, or approximately 150° C. or lower.

The weight-average molecular weight of the (meth) acrylic copolymer having an ultraviolet crosslinkable site can be approximately $1.5 \times 10^4$ or more, approximately $2.5 \times 10^4$ or more, or approximately $3.5 \times 10^4$ or more, approximately $1.0 \times 10^6$ or less, approximately $8.0 \times 10^5$ or less, or approximately $6.0 \times 10^5$ or less.

The viscosity of the (meth) acrylic copolymer having an ultraviolet crosslinkable site can be approximately 100 Pa·s or more, 300 Pa·s or more or approximately 500 Pa·s or more, $1.0 \times 10^5$ Pa·s or less, $5.0 \times 10^4$ Pa·s or less, or $1.0 \times 10^4$ Pa·s or less. By making viscosity of the (meth) acrylic copolymer having an ultraviolet crosslinkable site in the range described above, the ultraviolet crosslinkable composition can be suitably used for molding the film by heat and extrusion. The viscosity of the (meth) acrylic copolymer having an ultraviolet crosslinkable site is determined in the same manner as the thermoplastic acrylic resin.

The mixing ratio of the (meth) acrylic copolymer having an ultraviolet crosslinkable site and the thermoplastic acrylic resin (the (meth) acrylic copolymer having an ultraviolet crosslinkable site/the thermoplastic acrylic resin) can be approximately 1.0 or less, approximately 0.9 or less, or approximately 0.8 or less, approximately 0.0005 or more, or approximately 0.001 or more. By making the mixing ratio of the thermoplastic acrylic resin in the range described above, the ultraviolet crosslinkable composition can be suitably used for a variety of applications without the thermoplastic acrylic resin losing inherent characteristics such as thermoplasticity.

The thermoplastic acrylic resin and the (meth) acrylic copolymer having an ultraviolet crosslinkable site can be produced by polymerizing the monomer described above in the presence of a polymerization initiator. A typical radical polymerization method, for example, solution polymerization, emulsion polymerization, suspension polymerization or bulk polymerization and the like can be used as the polymerization method. Typical radical polymerization by a heat polymerization initiator is used so that the ultraviolet crosslinkable site does not react. Examples of the heat polymerization initiator are organic peroxides such as benzoyl peroxide, t-butyl benzoate, cumene hydroperoxide, diisopropyl peroxydicarbonate, di-n-propylperoxydicarbonate, di (2-ethoxyethyl) peroxydicarbonate, t-butyl peroxyneodecanoate, t-butyl peroxypivalate, lauroyl peroxide, (3,5, 5-trimethyl hexanoyl) peroxide, dipropionylperoxide, and diacetyl peroxide; and azo compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2-,2'-azobis(2-methylpropionate), 4,4'-azobis(4-cyanovaleric acid), 2,2'-azobis(2-hydroxymethylpropionitrile), and 2,2'-azobis[2-(2-imidazoline-2-yl)propane].

The ultraviolet crosslinkable composition may further include optional components such as other thermoplastic resins such as polyester and polycarbonate, a polymerizable oligomer, pigment, dye, filler, and an antioxidant.

The ultraviolet crosslinkable composition can be obtained by mixing the thermoplastic acrylic resin, the (meth)acrylic copolymer having an ultraviolet crosslinkable site, as well as a photoinitiator as necessary, and other optional components and the like. Mixing may be carried out by a solution mixture using an organic solvent, for example, ethyl acetate, butyl acetate, acetone, methyl ethyl ketone, toluene and the like. Mixing can be carried out by melt kneading using a single screw or twin screw extruder, a heat kneader, a Banbury mixer and the like.

The ultraviolet crosslinkable composition can be formed in various shapes such as a board shape, film shape and a sheet shape. Various methods can be used as the molding method such as injection molding, extrusion molding, transfer molding, and solution casting. By solution coating, coextruding and the like the ultraviolet crosslinkable composition may be applied to other articles, such as the surface of a laminate film.

The ultraviolet crosslinkable composition of the present disclosure can be suitably used as a surface layer (outermost layer) of a decorative film used in, for example, insert molding (IM) or the three-dimensional overlay method (TOM). In a certain example, the decorative film can be molded by heat drawing after irradiating and curing the ultraviolet rays on the ultraviolet crosslinkable composition. In another example, after molding the decorative film by heat drawing (for example, approximately 120° C. to approximately 160° C. and a draw ratio of approximately 100% to approximately 200%), the hardness of the surface layer can be increased by irradiating ultraviolet rays on the ultraviolet crosslinkable composition.

A three dimensional shape such as an embossed pattern may be given to improve the design of a surface layer used for the purpose of retaining a film surface such as a marking film and a decorative film. Typically, the embossed pattern is formed by solution casting a surface layer composition on a carrier such as a carrier film having a three dimensional shape on the surface and by curing the composition by heating or ultraviolet irradiation. Coating by solution casting is an expensive process that requires a solvent and a carrier film. Meanwhile, direct embossment may be carried out on the surface layer after forming the surface layer on the film. However, when heat forming processes such as IM and TOM are used, the embossed pattern formed by direct embossment may be easily lost during heating, or chemical resistance, scratch resistance and the like may be insufficient.

By carrying out embossment and the like on the ultraviolet crosslinkable composition of the present disclosure, a three dimensional shape can be given to the front surface. By this, a surface layer having a three dimensional shape such as the embossed pattern and the like on the surface can be formed easily and at a low cost; and the formed surface layer can retain such shape under a high temperature environment. An embossed shape is given before irradiating the ultraviolet rays in an embodiment in which the decorative film is molded by heat drawing after curing by irradiating the ultraviolet rays on the ultraviolet crosslinkable composition. In the embodiment in which the decorative film is molded by heat drawing after curing by irradiating the ultraviolet rays on the ultraviolet crosslinkable composition, it is possible to give an embossed shape before or after molding by heat drawing. Because the retention and moldability of the surface embossed shape is favorable, it is advantageous to impart the embossed shape after heat draw molding then carrying out ultraviolet irradiation thereafter.

The ultraviolet crosslinkable composition can be cured by irradiating ultraviolet rays after forming or after being applied on the surface of another article and given a three dimensional shape as necessary. The ultraviolet irradiation can be carried out using a light source such as a low pressure mercury lamp, a medium pressure mercury lamp, a high pressure mercury lamp, an ultrahigh pressure mercury lamp, a xenon lamp, a metal halide lamp, and an electrodeless lamp. The ultraviolet irradiation can be carried out in batches and can be continuously carried out by using a belt conveyer and the like. The ultraviolet irradiation amount (UV-C) can be approximately 1 m J/cm2 to approximately 500 m J/cm2.

The ultraviolet crosslinkable composition of the present disclosure has many useful applications where moldability or shape retention are necessary, and can, for example, be suitably used for surface coating, molding film, molded articles, and the like, having three dimensional shapes on the surface, such as embossing.

Examples

The following examples exemplify specific embodiments of the present disclosure; however, the present invention is not limited to these examples. All parts and percentages are given according to mass unless otherwise expressly stated.

The reagents, raw materials, and the like used in the present examples are shown in Table 1.

| Compound name, product name/abbreviation | Description | Provider |
|---|---|---|
| EtOAc | ethyl acetate | Wako Pure Chemical Industries, Ltd. (Osaka City, Osaka Prefecture, Japan) |
| BuOAc | butyl acetate | Wako Pure Chemical Industries, Ltd. (Osaka City, Osaka Prefecture, Japan) |
| MMA | methyl methacrylate | Mitsubishi Rayon Co., Ltd. (Chiyoda-ku, Tokyo, Japan) |
| BMA | n-butyl methacrylate | Mitsubishi Rayon Co., Ltd. (Chiyoda-ku, Tokyo, Japan) |
| MA | methacrylate | Wako Pure Chemical Industries, Ltd. (Osaka City, Osaka Prefecture, Japan) |
| EA | ethyl acrylate | Mitsubishi Rayon Co., Ltd. (Chiyoda-ku, Tokyo, Japan) |
| BA | n-butyl acrylate | Mitsubishi Rayon Co., Ltd. (Chiyoda-ku, Tokyo, Japan) |
| AEBP | 4-acryloyloxyethoxy benzophenone | 3M Company (St. Paul, Minnesota, USA) |
| 2-HEMA | 2-hydroxyethyl methacrylate | Mitsubishi Rayon Co., Ltd. (Chiyoda-ku, Tokyo, Japan) |
| MAA | methacrylic acid | Mitsubishi Rayon Co., Ltd. (Chiyoda-ku, Tokyo, Japan) |
| AA | acrylic acid | Toagosei Co., Ltd. (Minato-ku, Tokyo, Japan) |
| DM | dimethylamino ethyl methacrylate | Mitsubishi Rayon Co., Ltd. (Chiyoda-ku, Tokyo, Japan) |
| V-601 | dimethyl-2,2'-azobis(2-methylpropionate), polymer initiator | Wako Pure Chemical Industries, Ltd. (Osaka City, Osaka Prefecture, Japan) |
| V-65 | 2,2'-azobis(2,4-dimethyl-valeonitrile), polymer initiator | Wako Pure Chemical Industries, Ltd. (Osaka City, Osaka Prefecture, Japan) |

-continued

| Compound name, product name/abbreviation | Description | Provider |
|---|---|---|
| LP0 | lauroyl perozide, polymer initiator | NOF CORPORATION (Shibuya-ku, Tokyo, Japan) |
| Thioglycollic acid 2-ethylhexyl | chain transfer agent | Daicel Corporation (Osaka City, Osaka Prefecture, Japan) |
| Duranate TPA-100 | isocyanate crosslinking agent | Asahi Kasei Chemicals Corporation (Chiyoda-ku, Tokyo, Japan) |
| E-5XM | epoxy crosslinking agent | Soken Chemical & Engineering Co., Ltd. (Toshima-ku, Tokyo, Japan) |
| Acrypet ™ SV001 | PMMA resin, MFR = 20.0 g/10 min (JIS K 7210, IS01133, 230° C. 37.3N) Tg = 112° C., viscosity = 1.760 Pa · s | Mitsubishi Rayon Co., Ltd. (Chiyoda-ku, Tokyo, Japan) |
| Deplet ™ 980 N | PMMA resin, MFR = 1.6 g/10 min (IS01133, cond13), Tg = 133° C. viscosity = 9.098 Pa · s | Asahi Kasei Chemicals Corporation (Chiyoda-ku, Tokyo, Japan) |
| D6260 | aqueous polyurethane solution | Dainichieseika Color & Chemicals Mfg. Co., Ltd. (Chuo-ku, Tokyo, Japan) |

Gel Fraction

Whether crosslinking is occurring by ultraviolet irradiation is observed by gel fraction measurement of the acrylic film containing the ultraviolet crosslinkable composition. The 0.5 g of ultraviolet irradiated acrylic film is cut out and weighed. The cutout acrylic film and the 25 g of tetrahydrofuran (THF) are placed in a 50 mL vial, which is then sealed and shaken with a shaker for one day. The mixture is suction filtered using a Kiriyama-rohto (TM) no. 6. The filtrate is dried for one hour at 90° C. and the residue is weighed. The gel fraction is calculated using the following formula:

Gel fraction (%)=(1−y/x)×100 x: mass of acrylic film (g)
y: mass of residue (g)

Glass Transition Temperature (Tg)

The glass transition temperature (Tg) of each component is measured using the ARES dynamic viscoelasticity measuring device (TA Instruments Japan Inc., Shinagawa-ku, Tokyo, Japan). A sample is prepared by punching a 7.9 mm diameter in a film of each component, the heat is elevated from −60° C. to 250° C. at a heat elevation rate of 5° C./minute, every 12 seconds the shear storage modulus G' and shear loss modulus G" are measured at a shearing mode frequency of 1.0 Hz, and the peak temperature of the obtained loss factor tan δ (shear loss elastic modulus G"/shear storage elastic modulus G') is used as the glass transition temperature.

Viscosity

The viscosity (Pa·s) of each component is measured using the ARES dynamic viscoelasticity measuring device (TA Instruments Japan Inc., Shinagawa-ku, Tokyo-to, Japan). A sample is prepared by punching a 7.9 mm diameter in a film of each component, the heat is elevated from −60° C. to 250° C. at a heat elevation rate of 5° C./minute, the 230° C. shear loss elastic modulus G" is measured at a shearing mode frequency of 1.0 Hz (measuring frequency), that value is divided by the measuring frequency, and that value is used as the viscosity.

Pencil Hardness

Pencil hardness is measured according to the JIS K5600-5-4 standard using a PSH540-401T (Toyo Seiki Seisaku-Sho, Ltd., Kita-ku, Tokyo, Japan) as the testing device.

Number-Average Molecular Weight Mn and Weight-Average Molecular Weight Mw

The measurement of a number-average molecular weight Mn and a weight-average molecular weight Mw for each component is performed according to the gel permeation chromatography (GPC) method using the following devices and conditions.

Device: HP-1090 Series II (Hewlett-Packard Company)
Solvent: tetrahydrofuran
Column: PLgel MIXED-Bx2 (300 mm×7.5 mm outer diameter×5 mm inner diameter)
Flow rate: 1.0 mL/minute
Detection means: refractive index
Sample concentration: 0.1 mass %
Calibration standard: polystyrene Synthesis of (Meth)Acrylic Copolymer (Additive 1-6) Having an Ultraviolet Crosslinkable Site The materials shown in Table 2 were placed into a 500 mL or a 225 mL screw cap vial, nitrogen bubbling was performed for 10 minutes, then it was allowed to react in a 65° C. bath for 24 hours. The surface of the PET film liner was coated with the obtained additives 1-3, and dried for 10 minutes at 100° C. The acrylic film layer obtained from additives 1-3 was dried in a vacuum at 120° C. for many hours, and the solids obtained became additives 4-6.

TABLE 2

(numbers are mass parts)

| Composition | Additives 1/4 MMA/AEBP = 95/5 | Additives 2/5 MMA/AEBP = 80/20 | Additive 3/6 MMA/MA/ MAA/AEBP = 79/10/6/5 |
|---|---|---|---|
| ETOAc | 317.25 | 317.25 | 112.80 |
| MMA | 106.88 | 90.00 | 31.60 |
| AEBP | 5.63 | 22.50 | 2.00 |
| MAA | — | — | 2.40 |
| MA | — | — | 4.00 |
| V-601 10% EtOH solution | 22.50 | 22.50 | 8.00 |
| Total | 452.25 | 452.25 | 160.80 |
| Mn | $1.6 \times 10^4$ | $1.6 \times 10^4$ | $1.8 \times 10^4$ |
| Mw | $4.1 \times 10^4$ | $4.0 \times 10^4$ | $4.4 \times 10^4$ |
| Mw/Mn | 2.6 | 2.6 | 2.5 |
| Tg (° C.) | 105 | 107 | 107 |
| Viscosity (Pa · s) | 1,005 | <1,300[1] | 965 |

[1]Estimates made from viscosity measured at 210° C. (1300 Pa · s) because viscosity is too low and cannot be measured at 230° C.

Synthesis of Thermoplastic Acrylic Resin 1

The materials shown in Table 3 were placed in a 1 L vile, nitrogen bubbling was performed for 10 minutes, then it was allowed to react in a 65° C. bath for 24 hours. 782.52 parts of the obtained solution of the reaction product was diluted in 111.79 parts butyl acetate and a 35% ethyl acetate/butyl acetate of the thermoplastic acrylic resin 1 (PMMA resin) was obtained.

TABLE 3

(Numbers are mass parts)

| Compostion | Thermoplastic acrylic resin 1<br>MMA = 100 (PMMA resin) |
|---|---|
| EtOAc | 520.56 |
| MMA | 360.00 |
| V-602 10% EtOH solution | 21.60 |
| Total | 902.16 |
| Mn | $4.2 \times 10^4$ |
| Mw | $9.5 \times 10^4$ |
| Mw/Mn | 2.2 |
| Tg (° C.) | 129 |
| Viscosity (Pa · s) | 964 |

Synthesis of Thermoplastic Acrylic Resin 2

0.5 mass parts of disodium hydrogen phosphate, which is the suspension agent, and 200 mass parts of deionized water were inserted in a reaction vessel. Then, while stirring at 300 rpm, a monomer mixed solution composed of 0.95 mass parts of LPO dissolved in 86.8 mass parts of MMA, 10.3 mass parts of EA, 2.8 mass parts of MAA, and 0.15 mass parts of thioglycollic acid 2-ethylhexyl was added, then allowed to polymerize at 60° C. for three hours while nitrogen replacement occurred in the reaction vessel, and then again at 80° C. for three hours. The obtained polymer was rinsed four times using deionized water containing triple the resin amount, and bead-shaped suspension polymer particles were obtained by drying. The volume average particle size of the obtained polymer was approximately 500 μm, the Mn was 150,000, and the Mw was 340,000. The obtained suspension polymer particles were dissolved in ethyl acetate/butyl acetate and a 35% ethyl acetate/butyl acetate solution of thermoplastic acrylic resin 2 was obtained.

Synthesis of Thermoplastic Acrylic Resin 3

0.5 mass parts of disodium hydrogen phosphate, which is the suspension agent, and 200 mass parts of deionized water were inserted in a reaction vessel. Then, while stirring at 300 rpm, a monomer mixed solution composed of 0.95 mass parts of LPO dissolved in 86.5 mass parts of MMA, 10.0 mass parts of EA, 3.5 mass parts of 2-HEMA, and 0.10 mass parts of thioglycollic acid 2-ethylhexyl was added, then allowed to polymerize at 60° C. for three hours while nitrogen replacement occurred in the reaction vessel, and then again at 80° C. for three hours. The obtained polymer was rinsed four times using deionized water containing triple the resin amount, and bead-shaped suspension polymer particles were obtained by drying. The volume average particle size of the obtained polymer was approximately 500 μm, the Mn was 210,000, and the Mw was 570,000. The obtained suspension polymer particles were dissolved in ethyl acetate/butyl acetate and a 35% ethyl acetate/butyl acetate solution of thermoplastic acrylic resin 3 was obtained.

Synthesis of Thermoplastic Acrylic Resin 4

0.5 mass parts of disodium hydrogen phosphate, which is the suspension agent, and 200 mass parts of deionized water were inserted in a reaction vessel. Then, while stirring at 300 rpm, a monomer mixed solution composed of 0.95 mass parts of LPO dissolved in 86.6 mass parts of MMA, 10.5 mass parts of MA, 2.8 mass parts of MAA, and 0.15 mass parts of thioglycollic acid 2-ethylhexyl was added, then allowed to polymerize at 60° C. for three hours while nitrogen replacement occurred in the reaction vessel, and then again at 80° C. for three hours. The obtained polymer was rinsed four times using deionized water containing triple the resin amount, and bead-shaped suspension polymer particles were obtained by drying. The volume average particle size of the obtained polymer was approximately 500 μm, the Mn was 160,000, and the Mw was 360,000. The obtained suspension polymer particles were dissolved in ethyl acetate/butyl acetate and a 35% ethyl acetate/butyl acetate solution of thermoplastic acrylic resin 4 was obtained.

Synthesis of Thermoplastic Acrylic Resin 5

0.5 mass parts of disodium hydrogen phosphate, which is the suspension agent, and 200 mass parts of deionized water were inserted in a reaction vessel. Then, while stirring at 300 rpm, a monomer mixed solution composed of 0.95 mass parts of LPO dissolved in 86.6 mass parts of MMA, 10.5 mass parts of MA, 2.8 mass parts of MAA, and 0.35 mass parts of thioglycollic acid 2-ethylhexyl was added, then allowed to polymerize at 60° C. for three hours while nitrogen replacement occurred in the reaction vessel, and then again at 80° C. for three hours. The obtained polymer was rinsed four times using deionized water containing triple the resin amount, and bead-shaped suspension polymer particles were obtained by drying. The volume average particle size of the obtained polymer was approximately 500 μm, the Mn was 80,000, and the Mw was 170,000. The obtained suspension polymer particles were dissolved in ethyl acetate/butyl acetate and a 35% ethyl acetate/butyl acetate solution of thermoplastic acrylic resin 5 was obtained.

Synthesis of Thermoplastic Acrylic Resin 6

0.5 mass parts of disodium hydrogen phosphate, which is the suspension agent, and 200 mass parts of deionized water were inserted in a reaction vessel. Then, while stirring at 300 rpm, a monomer mixed solution composed of 0.95 mass parts of LPO dissolved in 97.2 mass parts of MMA, 2.8 mass parts of MAA, and 0.35 mass parts of thioglycollic acid 2-ethylhexyl was added, then allowed to polymerize at 60° C. for three hours while nitrogen replacement occurred in the reaction vessel, and then again at 80° C. for three hours. The obtained polymer was rinsed four times using deionized water containing triple the resin amount, and bead-shaped suspension polymer particles were obtained by drying. The volume average particle size of the obtained polymer was approximately 500 μm, the Mn was 70,000, and the Mw was 170,000. The obtained suspension polymer particles were dissolved in ethyl acetate/butyl acetate and a 35% ethyl acetate/butyl acetate solution of thermoplastic acrylic resin 6 was obtained.

The compositions and physical properties of thermoplastic acrylic resins 2-6 are shown in Table 4.

TABLE 4

(Numbers are mass parts)

|  | Thermoplastic acrylic resin 2 | Thermoplastic acrylic resin 3 | Thermoplastic acrylic resin 4 | Thermoplastic acrylic resin 5 | Thermoplastic acrylic resin 6 |
|---|---|---|---|---|---|
| MMA | 86.8 | 86.6 | 86.6 | 86.6 | 97.2 |
| MA | — | — | 10.5 | 10.5 | — |
| EA | 10.3 | 9.9 | — | — | — |
| 2-HEMA | — | 3.5 | — | — | — |
| MAA | 2.8 | — | 2.8 | 2.8 | 2.8 |
| Total | 99.9 | 100 | 99.9 | 99.9 | 100 |
| Mn | 150,700 | 209,800 | 159,600 | 83,500 | 86,600 |
| Mw | 338,700 | 574,300 | 356,600 | 173,200 | 167,900 |
| Mw/Mn | 2.25 | 2.74 | 2.23 | 2.07 | 1.94 |
| Tg (° C.) | 89 | 95 | 94 | 94 | 107 |
| Viscosity (Pa · s) | 4,123 | 2,370 | 8,299 | — | 3,214 |

Preparation of Acrylic Film Using a Solvent Cast

All materials were placed in a vile and mixed so the solids could become the compound ratios shown in Table 5. The obtained mixture was applied to the surface of a PET film liner, dried at 100° C. for 10 minutes, and an acrylic film having a thickness of 20 μm was obtained.

Preparation of Acrylic Film Using a Hot Melt

All materials of the compound ratios shown in Table 6 were mixed at 230° C. for 10 minutes in a mixer (Brabender® GmbH & Co. KG, Plasti-Corder® PL2100). The mixture was elongated at 160° C. using a hot press and an acrylic film having a thickness of 75 μm was obtained.

Ultraviolet Irradiation

Ultraviolet rays (UV-C) were irradiated on the acrylic film at an irradiation dose of 90 mJ/cm$^2$ using an ultraviolet irradiation device (H bulb, DRS model, Fusion UV Systems Inc.). The AEBP content percentage (μmol/g) as well as the gel fraction before and after ultraviolet irradiation are shown in Table 5 and Table 6.

Preparation of Decorative Film

A decorative film having an outermost layer using the ultraviolet crosslinkable composition was prepared according to the following procedure.

Preparation of Intermediate Surface Layer 95 mass parts of MMA, 4 mass parts of MAA, 1 mass part of 2-HEMA as the monomer containing a hydroxyl group, 150 mass parts of ethyl acetate as a solvent, and 0.6 mass parts of V-601 as the polymerization initiator were mixed, polymerization reaction was performed at 65° C. for 24 hours under a nitrogen atmosphere, and an ethyl acetate solvent of a (meth) acrylic copolymer was produced.

Isocyanate crosslinking duranate TPA-100 was mixed in the obtained (meth) acrylate copolymer solution so the isocyanate group based on a 100 g solid mass would be 15.0 mmol and was applied using a knife coating method to the surface of a flat transparent PET film (T-60, Toray Industries, Inc.) having a thickness of approximately 50 μm, which is the support sheet. This was allowed to dry in an oven (ESPEC Corp. PV-221 industrial oven) at 90° C. for 3 minutes, then at 120° C. for 5 minutes, for a total of 8 minutes, and an intermediate surface layer having a thickness of approximately 30 μm was formed on the PET film.

Preparation of Substrate Layer

A D6260 aqueous polyurethane solvent was applied to the intermediate surface layer using a knife coating method and thereafter dried at 160° C. for 2 minutes, and a substrate layer composed of polyurethane having a thickness of 30 μm was formed on the intermediate surface layer.

Preparation of Adhesive Layer 94 mass parts of BA, 6 mass parts of AA, 185.7 mass parts of ethyl acetate as the solvent, and 0.2 mass parts of V-65 as the polymerization initiator were mixed, then allowed to react under a nitrogen atmosphere at 50° C. for 24 hours and an ethyl acetate solution of acrylic polymer A was produced. The weight-average molecular weight of acrylic polymer A was approximately 580,000.

60 mass parts of MMA, 34 mass parts of BMA, and 6 mass parts of DM, 150 mass parts of ethyl acetate as the solvent, and 0.6 mass parts of V-601 as the polymerization initiator were mixed, then allowed to react under a nitrogen atmosphere at 65° C. for 24 hours and an ethyl acetate solution of acrylic polymer B was produced. The weight-average molecular weight of acrylic polymer B was approximately 96,000.

The solution of acrylic polymer A and the solution of acrylic polymer B were mixed at a solid ratio of 70:30, and 0.1 mass % of E-5XM epoxy crosslinking agent was added as a crosslinking agent in a solid ratio relative to the entirety of solid parts of the polymer. The obtained solution was applied to a release treated polyester film and dried at 100° C. for 5 minutes, and an acrylic adhesive layer having a thickness of 40 μm was formed.

Preparation of Outermost Layer

After the materials shown in Table 7 were dried at 80° C. for 4 hours, they were mixed in a mixer (Brabender® GmbH & Co. KG, Plasti-Corder® PL2100) at 230° C. for 10 minutes at the compound ratio shown in the table. Next, the PET film T-60 was peeled and the mixture was elongated at 160° C. using a uniaxial thermoplastic resin extruder to laminate an acrylic outermost layer having a thickness of 120 μm on the exposed intermediate surface layer.

Preparation of Decorative Film

The polyurethane layer and the acrylic adhesive layer carried by the polyester film were placed facing each other, and pasted using a roll-type laminator under the conditions of 60° C. and 2 kgf of pressure. The decorative layer having the ultraviolet crosslinkable composition as the outermost layer was prepared in this manner.

Heat Drawing of Decorative Film

After irradiating the ultraviolet rays from the outermost layer side of the decorative film, the polyester film was peeled from the adhesive layer of the decorative film and the adhesive layer was made bare, then, using TOM at a molding temperature of 125° C., the decorative film was introduced and pasted to the adhesive layer on an ABS/PC substrate so that the area elongation rate becomes 100%. If no appearance defects and the like such as cracks are present on the outermost layer composed of the ultraviolet cross-linkable composition, then heat drawing is favorable. The heat drawing of the decorative film as well as the test results of the pencil hardness of the outermost layer are shown in Table 7.

Embossing Process

An embossed (raised) shape was formed on the outermost layer by causing a mold having an embossed (raised) shape to contact the outermost layer of the decorative film of example 17 while heating. The depth of the embossed (raised) shape at this time was 33 μm. Thereafter, the ultraviolet rays were irradiated from the outermost layer side at an irradiation dose of 90 mJ/cm² using an ultraviolet irradiation device (H bulb, DRS model, Fusion UV Systems Inc.). Then, the polyester film was peeled from the adhesive layer of the decorative film and the adhesive layer was made bare, then, using TOM at a molding temperature of 135° C., the decorative film was introduced and pasted to the adhesive layer on an ABS/PC substrate so that the area elongation rate becomes 100%. There were no appearance defects and the like such as cracks present on the outermost layer of this sample, thus heat drawing was favorable. The pencil hardness of the outermost layer was 2H. The depth of the embossed (raised) shape at this time was 26 μm. Measurements of the depth of the embossed (raised) shape were measured after samples were cut out with a razor blade by observing the cross-sections of those samples with an optical microscope (VHX-600, Keyence Corp.).

TABLE 5

(Numbers are mass parts)

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Thermoplastic acrylic resin 1 | 80 | 95 | 81 | — | — | — | — | — | — | — |
| Thermoplastic acrylic resin 2 | — | — | — | 80 | 95 | 90 | — | — | — | — |
| Thermoplastic acrylic resin 3 | — | — | — | — | — | — | 80 | 95 | — | — |
| Thermoplastic acrylic resin 4 | — | — | — | — | — | — | — | — | 80 | 95 |
| Thermoplastic acrylic resin 5 | — | — | — | — | — | — | — | — | — | — |
| Thermoplastic acrylic resin 6 | — | — | — | — | — | — | — | — | — | — |
| SV001 | — | — | — | — | — | — | — | — | — | — |
| 980N | — | — | — | — | — | — | — | — | — | — |
| Additive 1 | 20 | — | — | 20 | — | 10 | 20 | — | 20 | — |
| Additive 2 | — | 5 | 19 | — | 5 | — | — | 5 | — | 5 |
| Additive 3 | — | — | — | — | — | — | — | — | — | — |
| AEBP content percentage (μmol/g) | 32 | 32 | 122 | 32 | 32 | 16 | 32 | 32 | 32 | 32 |
| Gel fraction before UV irradiation (%) | 0 | 0 | 0 | 0 | 0 | 0 | 0 | 0 | 0 | 0 |
| Gel fraction after UV irradiation (%) | 53.8 | 47.4 | 83.5 | 78.4 | 77.9 | 23 | 83.9 | 83.9 | 74.4 | 79.1 |

TABLE 6

(Numbers are mass parts)

|  | Example 11 | Example 12 | Example 13 | Example 14 | Example 15 | Example 16 | Comparison example 1 |
|---|---|---|---|---|---|---|---|
| Thermoplastic acrylic resin 1 | — | — | — | — | — | — | — |
| Thermoplastic acrylic resin 2 | — | — | — | — | — | — | — |
| Thermoplastic acrylic resin 3 | — | — | — | — | — | — | — |
| Thermoplastic acrylic resin 4 | — | — | — | — | — | — | — |
| Thermoplastic acrylic resin 5 | — | — | — | — | 80 | — | — |
| Thermoplastic acrylic resin 6 | — | — | — | — | — | 80 | — |
| SV001 | 80 | 95 | 80 | — | — | — | 100 |
| 980N | — | — | — | 80 | — | — | — |
| Additive 4 | 20 | — | — | 20 | 20 | 20 | — |
| Additive 5 | — | 5 | — | — | — | — | — |
| Additive 6 | — | — | 20 | — | — | — | — |
| AEBP content percentage (μmol/g) | 32 | 32 | 32 | 32 | 32 | 32 | 0 |

TABLE 6-continued (Numbers are mass parts)

|  | Example 11 | Example 12 | Example 13 | Example 14 | Example 15 | Example 16 | Comparison example 1 |
|---|---|---|---|---|---|---|---|
| Gel fraction before UV irradiation (%) | 0 | 0 | 0 | 0 | 0 | 0 | 0 |
| Gel fraction after UV irradiation (%) | 11.7 | 11.3 | 12.8 | 10 | 13.5 | 12 | 0 |

TABLE 7

(Numbers are mass parts)

|  | Example 17 | Example 18 | Example 19 |
|---|---|---|---|
| SV001 | 80 | 90 | 95 |
| Additive 4 | 20 | 10 | 5 |
| Heat elasticity | Favorable | Favorable | Favorable |
| Pencil hardness | 2H | 2H | HB |

What is claimed is:

1. A cured product made by curing an ultraviolet crosslinkable composition comprising:
   a thermoplastic acrylic resin in which a glass transition temperature is 25° C. or higher and containing 50 mass % or greater of methyl methacrylate units; and
   a (meth) acrylic copolymer having an ultraviolet crosslinkable site in which a glass transition temperature is 25° C. or higher,
   wherein the ultraviolet crosslinkable composition is in the form of a film, the ultraviolet crosslinkable site has a structure in which a hydrogen radical can be removed by ultraviolet irradiation, the ultraviolet crosslinkable site is a benzophenone group, and the number of moles of the benzophenone group is 0.3 to 320 μmol/g based on the total mass of the thermoplastic acrylic resin and the (meth) acrylic copolymer having the ultraviolet crosslinkable site in which a glass transition temperature is 25° C. or higher,
   and further wherein the cured product has been molded by application of heat.

2. The cured product according to claim 1, wherein the mixing ratio of the (meth) acrylic copolymer having the ultraviolet crosslinkable site in which a glass transition temperature is 25° C. or higher to the thermoplastic acrylic resin (the (meth) acrylic copolymer having the ultraviolet crosslinkable site in which a glass transition temperature is 25° C. or higher/thermoplastic acrylic resin) is 0.0005 to 1.0.

3. A decorative multilayer film comprising an outermost layer, with the outermost layer comprising an ultraviolet crosslinkable composition, and the ultraviolet crosslinkable composition comprising:
   a thermoplastic acrylic resin in which a glass transition temperature is 25° C. or higher and containing 50 mass % or greater of methyl methacrylate units; and
   a (meth) acrylic copolymer having an ultraviolet crosslinkable site in which a glass transition temperature is 25° C. or higher, wherein the outermost layer is molded by heat drawing.

4. The decorative film according to claim 3, wherein the outermost layer is formed into a three dimensional shape having a draw ratio of from 100% to 200%.

5. The decorative film according to claim 3, wherein the ultraviolet crosslinkable site is a benzophenone group and the number of moles of the benzophenone group is 0.3 to 320 μmol/g based on the total mass of the thermoplastic acrylic resin and the (meth) acrylic copolymer having the ultraviolet crosslinkable site in which a glass transition temperature is 25° C. or higher.

6. The decorative film according to claim 4, wherein the ultraviolet crosslinkable site is a benzophenone group and the number of moles of the benzophenone group is 0.3 to 320 μmol/g based on the total mass of the thermoplastic acrylic resin and the (meth) acrylic copolymer having the ultraviolet crosslinkable site in which a glass transition temperature is 25° C. or higher.

7. The cured product according to claim 1, wherein the (meth)acrylic copolymer having the ultraviolet crosslinkable site in which a glass transition temperature is 25° C. or higher is a copolymer of at least one alkyl (meth)acrylate selected from the group consisting of alkyl (meth)acrylates having a linear, branched or cyclic alkyl group having 1 to 22 carbon atoms, and a (meth)acrylate having a benzophenone group selected from the group consisting of 4-acryloyloxybenzophenone, 4-acryloyloxyethoxybenzophenone, 4-acryloyloxy-4'-methoxybenzophenone, 4-acryloyloxyethoxy-4'-methoxybenzophenone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and mixtures thereof.

8. The cured product according to claim 1, wherein the (meth)acrylic copolymer having the ultraviolet crosslinkable site in which a glass transition temperature is 25° C. or higher is a copolymer of a monomer mixture containing methyl methacrylate and a (meth)acrylate having a benzophenone group.

9. The decorative film according to claim 3, wherein the (meth)acrylic copolymer having the ultraviolet crosslinkable site in which a glass transition temperature is 25° C. or higher is a copolymer of at least one alkyl (meth)acrylate selected from the group consisting of alkyl (meth)acrylates having a linear, branched or cyclic alkyl group having 1 to 22 carbon atoms, and a (meth)acrylate having a benzophenone group selected from the group consisting of 4-acryloyloxybenzophenone, 4-acryloyloxyethoxybenzophenone, 4-acryloyloxy-4'-methoxybenzophenone, 4-acryloyloxyethoxy-4'-methoxybenzophenone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and mixtures thereof.

10. The decorative film according to claim 3, wherein the (meth)acrylic copolymer having the ultraviolet crosslinkable site in which a glass transition temperature is 25° C. or higher is a copolymer of a monomer mixture containing methyl methacrylate and a (meth)acrylate having a benzophenone group.

11. The cured product according to claim 1, wherein the (meth)acrylic copolymer has an ultraviolet crosslinkable site in which a glass transition temperature is 40° C. or higher.

12. The cured product according to claim 11, wherein the (meth)acrylic copolymer has an ultraviolet crosslinkable site in which a glass transition temperature is 60° C. or higher.

* * * * *

UNITED STATES PATENT AND TRADEMARK OFFICE
CERTIFICATE OF CORRECTION

PATENT NO. : 10,961,379 B2
APPLICATION NO. : 15/550881
DATED : March 30, 2021
INVENTOR(S) : Minori Kawagoe It is certified that error appears in the above-identified patent and that said Letters Patent is hereby corrected as shown below:

In the Specification

Column 3
Line 5, delete "1,4 cyclohexane" and insert -- 1,4-cyclohexane --, therefor.
Line 30, delete "$6.0 \times 10^6$" and insert -- $6.0 \times 10^5$ --, therefor.

Column 4
Line 45, delete "4-acryloyloxyethoxy-4'-methoxybenzophenzone," and insert -- 4-acryloyloxyethoxy-4'-methoxybenzophenone, --, therefor.

Column 5
Line 54, delete "1,4 cyclohexane" and insert -- 1,4-cyclohexane --, therefor.

Column 6
Line 51, delete "di (2-ethoxyethyl)" and insert -- di(2-ethoxyethyl) --, therefor.
Line 58, delete "dimethyl-2-,2'" and insert -- dimethyl-2,2' --, therefor.

Columns 7-8
Line 49, delete "Et0Ac" and insert -- EtOAc --, therefor.
Line 51, delete "Bu0Ac" and insert -- BuOAc --, therefor.
Line 66, delete "valeonitrile)," and insert -- valeronitrile), --, therefor.

Columns 9-10
Line 4, delete "LP0" and insert -- LPO --, therefor.
Line 4, delete "perozide," and insert -- peroxide, --, therefor.
Line 5, delete "Thioglycollic" and insert -- Thioglycolic --, therefor.
Line 11, delete "Acrypet ™" and insert -- Acrypet™ --, therefor.
Line 14, delete "Deplet ™" and insert -- Deplet™ --, therefor.
Line 17, delete "Dainichieseika" and insert -- Dainichiseika --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,961,379 B2

Column 10
Line 49, delete "ETOAc" and insert -- EtOAc --, therefor.
Line 65, delete "vile," and insert -- vial, --, therefor.

Column 11
Line 10, delete "Compostion" and insert -- Composition --, therefor.
Line 30, delete "thioglycollic" and insert -- thioglycolic --, therefor.
Line 53, delete "thioglycollic" and insert -- thioglycolic --, therefor.

Column 12
Line 9, delete "thioglycollic" and insert -- thioglycolic --, therefor.
Line 31, delete "thioglycollic" and insert -- thioglycolic --, therefor.
Line 52, delete "thioglycollic" and insert -- thioglycolic --, therefor.

Column 13
Line 21, delete "vile" and insert -- vial --, therefor.